US008343895B2

(12) United States Patent
Van de Peer et al.

(10) Patent No.: US 8,343,895 B2
(45) Date of Patent: *Jan. 1, 2013

(54) ADDITIVE TO REDUCE FLUID LOSS FOR DRILLING FLUIDS

(75) Inventors: Dirk Van de Peer, Bevern (BE); Francois Cyriel D'Haese, Antwerp (BE); Rudolf J. Dams, Anwerp (BE)

(73) Assignee: 3M Innovative Properties Company, Saint Paul, MN (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/663,725

(22) PCT Filed: May 27, 2008

(86) PCT No.: PCT/US2008/064835
§ 371 (c)(1),
(2), (4) Date: Dec. 9, 2009

(87) PCT Pub. No.: WO2008/156970
PCT Pub. Date: Dec. 24, 2008

(65) Prior Publication Data
US 2010/0173804 A1 Jul. 8, 2010

(30) Foreign Application Priority Data

Jun. 18, 2007 (GB) .................................. 0711621.3

(51) Int. Cl.
*C09K 8/035* (2006.01)
(52) U.S. Cl. .......................... 507/119; 507/219; 507/275
(58) Field of Classification Search ........................ None
See application file for complete search history.

(56) References Cited

U.S. PATENT DOCUMENTS

| 3,691,140 | A | 9/1972 | Silver |
| 4,436,636 | A | 3/1984 | Carnicom |
| 5,053,436 | A | 10/1991 | Delgado |
| 5,719,247 | A | 2/1998 | Delgado et al. |
| 5,789,349 | A | 8/1998 | Patel |
| 5,826,669 | A | 10/1998 | Zaleski et al. |
| 6,518,224 | B2 | 2/2003 | Wood |
| 6,715,568 | B1 | 4/2004 | Bailey |
| 6,906,009 | B2 | 6/2005 | Shinbach et al. |
| 2002/0169085 | A1 | 11/2002 | Miller et al. |
| 2006/0167133 | A1 | 7/2006 | Gromsveld et al. |

FOREIGN PATENT DOCUMENTS

| WO | WO 92/11334 A1 | 7/1992 |
| WO | WO 93/12147 A1 | 6/1993 |
| WO | WO 01/53429 A1 | 7/2001 |
| WO | WO 2004/011530 | 2/2004 |
| WO | WO 2004/013251 | 2/2004 |
| WO | WO 2004/092301 | 10/2004 |
| WO | WO 2004/109053 A2 | 12/2004 |
| WO | WO 2006/040578 | 4/2006 |

OTHER PUBLICATIONS

Aston, M. et al., "Towards Zero Fluid Loss Oil Based Muds," *Society of Petroleum Engineers*, SPE 77446 (2002) p. 1-9.
Guichard, B. et al., "An Organosoluble Polymer for Outstanding Fluid-Loss Control With Minimum Damage," *Society of Petroleum Engineers*, SPE 107281 (2006) p. 1-6.
Herzhaft, B. et al., "Optimization of SBM Formulations for Minimum Damage," *Society of Petroleum Engineers*, SPE 64981 (2001) p. 1-7.
PCT International Search Report, PCT/US2008/064835, dated Nov. 26, 2008.

*Primary Examiner* — John J Figueroa
(74) *Attorney, Agent, or Firm* — C. Michael Geise

(57) ABSTRACT

Additives for reducing the loss of drilling fluid into the formation surrounding a wellbore during the drilling process as well as drilling fluids comprising the additives and methods of using such additives. The additive includes elastomeric, polymeric, and acrylate, non-agglomerated microspheres.

20 Claims, No Drawings

ADDITIVE TO REDUCE FLUID LOSS FOR DRILLING FLUIDS

CROSS REFERENCE TO RELATED APPLICATIONS

This application is a national stage filing under 35 U.S.C. 371 of PCT/US2008/064835, filed May 27, 2008, which claims priority to Great Britain Application No. 0711621.3, filed Jun. 18, 2007, the disclosure of which is incorporated by reference in its/their entirety herein.

The present invention relates to additives for reducing the loss of drilling fluid into the formation surrounding a wellbore during the drilling process as well as drilling fluids comprising such additives and methods of using such additives.

BACKGROUND

For the production of wells for the purpose of recovering hydrocarbons and other fluid and/or gaseous materials, boreholes are drilled into subterranean formations. Typically, a fluid is circulated during drilling from the surface through the interior of the drill string and the annulus between the drill string and the formation and back.

Drilling fluids, also referred to as "drilling muds", which include water-based and organic-based drilling fluids, such as oil-based and so-called synthetic-based drilling fluids, are used in the drilling of such wells. Drilling fluids typically have a number of functions including: lubricating the drilling tool and drill pipe which carries the tool; suspending and transporting formation cuttings to the surface for screening out and disposal; holding the cuttings in suspension in the event of a shutdown in the drilling and pumping of the drilling fluid; and counterbalancing formation pressures to prevent the inflow of gas, oil or water from permeable rocks which may be encountered at various levels as drilling continues. Having regard to these functions generally the drilling fluid used for a particular drilling operation is typically designed or otherwise selected to have particular rheological and density properties.

For a drilling fluid to perform the aforesaid functions and allow drilling to continue, the drilling fluid must stay in the borehole. Frequently, undesirable formation conditions are encountered during drilling in which small or substantial amounts of the drilling fluid may be lost to the formation. Drilling fluid can leave the borehole through large or small fissures or fractures in the formation, which may be either pre-existing or drilling-induced, or through a porous formation surrounding the borehole.

The basic mechanism of fluid loss control generally involves the formation of a filter cake of varying thickness, during drilling, on the sides of the borehole and hence at the interface of the porous or permeable formation. Unfortunately, subterranean formation conditions are frequently encountered during drilling which may result in unacceptable losses of drilling fluid to the surrounding formation despite the type of drilling fluid employed and filter cake created.

In these instances, fluid-loss control agents are added to the drilling fluid in an attempt to reduce the unacceptable high losses of drilling fluid to fractures and/or porous structure in the surrounding formation. Known examples of such fluid-loss control agents include graphitic carbon or graphite particles (see e.g. U.S. Pat. No. 5,826,669 (Zakeski) or WO 04/092301 (publication date Oct. 28, 2004)), or water soluble polymeric celluloses, starches or other polysaccharide derivatives. Other fluid-loss control agents have been described including gilsonite mineral powder (see e.g. Society of Petroleum Engineers, paper no SPE 77446 (Aston et al.)); crumb rubber particles (see e.g. U.S. Pat. No. 6,518,224 (Wood)); oil soluble silicone resin particles (see e.g. WO 04/013251 (publication date Feb. 5, 2004)); water insoluble polymer latices (see e.g. U.S. Pat. No. 6,715,568 (Bailey)), organosoluble polymer (see e.g. Society of Petroleum Engineers, paper nos. SPE 64981 (Herzhaft et al.) and SPE 107281 (Guichard et al.)), particulate polyolefin (see e.g. U.S. Pat. No. 4,436,636 (Carnicom)) and polymeric polypropylene granules (see e.g. WO 06/040578 (publication date Apr. 20, 2006).

SUMMARY

There is an ongoing need for effective additives for drilling fluids which can control (e.g. which can reduce) the loss of the fluids into the subterranean formation. In light of environmental issues and/or cost factors associated with the use of organic-based drilling fluids, such as oil-based and synthetic-based drilling fluids, it is desirable to provide such an additive that it is particularly suitable for controlling fluid loss of such drilling fluids.

In one aspect of the invention there is provided a fluid loss control additive for a drilling fluid wherein said drilling fluid is used in a drilling operation to produce a wellbore having a well temperature, said additive comprising polymeric, acrylate, non-agglomerated microspheres, wherein the microspheres have a glass transition temperature, said glass transition temperature being selected so that the microspheres are elastomeric at the well temperature.

The term "non-agglomerated microspheres" as used herein means that the microspheres are not provided in the form of a composite microsphere component comprising a composite of microsphere and a polymeric resin, more particularly not in the form of pellets having a continuous polymeric phase having microspheres dispersed therein, nor an agglomerate of microspheres bound together by a discontinuous phase of polymeric resin.

Use of such elastomeric, polymeric, acrylate, non-agglomerated microspheres as a fluid loss control additive in drilling fluids is advantageously effective in reducing fluid loss of drilling fluids into or through subterranean formation (e.g. porous formations) or formations having pre-existing or drill-induced fissures or fractures, surrounding the borehole.

Furthermore, use of additives described herein is particularly desirable in that the addition of such an additive to a drilling fluid typically does not have any appreciable impact on the rheological properties of the drilling fluid. This holds particularly true for organic-based drilling fluids, such as oil-based and synthetic-based drilling fluids as well as other types of organic-based drilling fluids.

In most instances additives described herein can be used without the need of having to add other additives to re-adjust rheological properties of the drilling fluid. Additives described herein can be easily and effectively used as a "prophylactic" to control loss of drilling fluid during drilling operations or as a "pill" treatment, when during drilling operations unacceptable levels of fluid loss are observed.

Microspheres of additives are favorably insoluble in water and/or in organic liquid, in particular in organic liquid used in organic-based drilling fluids (e.g. such as diesel oil or mineral oil used in oil-based drilling fluids, olefin-derived or ester-derived oils used in synthetic-based drilling fluids, (poly) glycol and (poly)glycol-derivatives used in other organic-based drilling fluids). Microspheres of additives are also favorably readily dispersible in water and/or in organic liquid, in particular in organic liquid used in organic-based drilling fluids (e.g. such as diesel oil or mineral oil used in oil-based drilling fluids, olefin-derived or ester-derived oils used in synthetic-based drilling fluids, (poly)glycol and (poly)glycol-derivatives used in other organic-based drilling fluids). Additives described herein are thus generally, favorably suitable for use in water-based drilling fluids and organic-based drilling fluids, such as oil-based and synthetic-based drilling fluids as well as other types of organic-based drilling fluids. Additives described herein are particularly advantageous for use in organic-based drilling fluids, such as oil-based and synthetic-based drilling fluids as well as other types of organic-based drilling fluids.

Preferably additives are provided in a dry form (e.g. microspheres provided in the form of a dry powder), or in the form of a suspension for ease in use and quick dispersion of microspheres into the drilling fluid.

An additional aspect of the present invention is the provision of a drilling fluid comprising an additive as described herein. Such drilling fluids may be water-based drilling fluids or, in particular, organic-based drilling fluids, such as oil-based drilling fluids and synthetic-based drilling fluids as well as other types of organic-based drilling fluids. Additives can be used at very high concentrations (e.g. up to 300 kg/m$^3$ relative to weight of microspheres), if desired. Generally however the concentration of additive, in other words microspheres, in the drilling fluid is selected for the particular drilling operation so that the concentration of microspheres in the drilling fluid is sufficient to reduce fluid loss. It has been found that additives described herein have such advantageous effectiveness in controlling fluid loss, generally the concentration of microspheres in drilling fluid need not be high. This holds particularly true for organic-based drilling fluids, such as oil-based drilling fluids and synthetic-based drillings fluids as well as other types of organic-based drilling fluids. Favorably the concentration of microspheres in drilling fluid may be 10 w/w % or lower, more favorably 8 w/w % or lower, even more favorably 5 w/w % or lower, and most favorably 3 w/w % or lower. Favorably the concentration of microspheres in drilling fluid is 0.1 w/w % or higher, more favorably 0.3 w/w % or higher, even more favorably 0.8 w/w % or higher and most favorably 1.5 w/w % or higher.

An additional aspect of the present invention includes a method of reducing fluid loss comprising the step of adding to a drilling fluid an additive as described herein; and circulating said drilling fluid during the drilling of a well.

A further aspect of the present invention is a method of reducing fluid loss comprising the step of monitoring drilling fluid losses during the drilling of a well; and if fluid losses exceed an acceptable level injecting an additive as described herein into the well.

Another aspect of the present invention is a method comprising: conducting drilling operations in a subterranean well that penetrates through one or more subterranean formations, wherein the conduct is carried out in the presence of a drilling fluid and an additive as described herein.

This summary is not intended to describe each disclosed embodiment or every implementation in accordance with the present invention. Dependent claims disclose additional embodiments and many other novel advantages, features, and relationships will become apparent as this description proceeds.

DETAILED DESCRIPTION

Fluid loss control additives for a drilling fluid, wherein said drilling fluid is used in a drilling operation to produce a wellbore having a well temperature, in accordance with the present invention comprise polymeric, acrylate, non-agglomerated microspheres, wherein the microspheres have a glass transition temperature, said glass transition temperature being suitably selected so that the microspheres are elastomeric at the well temperature.

The particular glass transition temperature of the microspheres of additives described herein can be suitably and is advantageously selected in light of the particular drilling operation (e.g. the well temperature) so that the microspheres of an additive are elastomeric at the particular well temperature and, accordingly, under the particular drilling operation conditions. Accordingly it will be appreciated that the particular, selected glass transition temperature of microspheres of an additive is suitably less than the particular well temperature of the particular drilling operation. Well temperatures generally range from about 50° C. to about 250° C. For universal applicability and functionality, microspheres of additives described herein may have a glass transition temperature equal to or less than 0° C., more suitably equal to or less than −20° C. However, it has been determined to be favorable in terms of enhanced effectiveness and/or efficiency to select the glass transition temperature of the microspheres of an additive in light of the particular drilling operation at hand and conditions of that particular drilling operation, in particular as related to fluid loss. For example, if during drilling of a wellbore, fluid loss is observed at a drilling depth of around 1800 m where the particular well temperature is about 200° C., the glass transition temperature of microspheres of an additive is suitably selected to be less than 200° C., more desirably in the range less than 200° C. down to about 150° C., most desirably in the range from about 150° C. to about 180° C. On the other hand, if, for example, during drilling of a wellbore, fluid loss is observed at a drilling depth of around 700 m where the particular well temperature is about 120° C., the glass transition temperature of microspheres of an additive is suitably selected to be less than 120° C., more desirably in the range less than 120° C. down to about 70° C., most desirably in the range from about 70° C. to about 100° C. As will be appreciated from the mentioned examples, it is favorable to generally match (in so far as possible) microspheres of an additive to a particular drilling operation at hand and conditions of that particular drilling operation, in particular as related to fluid loss so that the glass transition temperature of microspheres is high as possible relative to the particular well/drilling operation conditions, while at the same time the glass transition temperature is such that the elastomeric nature of the microspheres within the drilling fluid under the particular well/drilling operation conditions is ensured. Suitably microspheres of additives described herein generally have a glass transition temperature equal to or less than 200° C. Favorably the glass transition temperature is equal to or less than the value of the well temperature minus 20° C., more favorably the glass transition temperature is equal to or less the value of the well temperature minus 35° C., and most favorably the glass transition temperature is equal to or less than the value of the well temperature minus 50° C. In terms of matching an additive to a particular drilling operation condition, microspheres of such an additive generally have a glass transition temperature greater than 0° C. Additives described herein may be advantageously provided in a variety of grades. For example, suitable grades of additives may include a grade having microspheres with a glass transition temperature in the range from 150° C. up to but not including 200° C. and a grade with a glass transition temperature in the range from 100° up to but not including 150° C. (e.g. for high temperature drilling operation conditions (e.g. ≧200° C. or ≧150° C., respectively)). Other suitable grades of additives may include a grade having microspheres with a glass transition temperature in the range from 50° up to but not including 100° C. and a grade with a glass transition temperature 50° C. or less (more suitably in a range between 0° C. and 50° C., even more suitably from about 20° C. up to but not including 50° C.) as well as a grade having microspheres with a glass transition temperature equal to or less than 0° C. (or more suitably equal to or less than −20° C.) (e.g. for low temperature (<150° C.) drilling operation conditions and/or, as applicable, for general or universal application).

Due to their elastomeric nature under well/drilling operation conditions as described above, microspheres of additives described herein are favorably compressible which facilitates their use in blocking fissures and/or fractures in subterranean formations as well as porous structures in subterranean formations, thereby reducing fluid loss. Without wishing to be bound to a particular theory, it seems that microspheres of additives described herein advantageously and effectively fill voids within the filter cake especially voids along the external portion of the cake, and thus, allowing for reduction of fluid loss by blocking fissures and/or fracture and/or porous structures in subterranean formations with substantially no penetration of microspheres into the fissures, fractions and porous structures of the subterranean formation.

Furthermore microspheres are desirably infusible. Infusibility is advantageous in that the microspheres remain as microspheres (i.e. the microspheres do not fuse together (e.g., to form larger structures such as a mass of polymeric acrylate material)). Besides facilitating the interaction between the microspheres and their functionality in blocking fissures, fractions and porous formations during drilling operation, infusibility is advantageous in that after completion of drilling operations an eventual removal of the additive from. a (e.g. hydrocarbon) producing zone in a well operation is not immediately precluded due to formation of larger structures, such as mass(es) of polymeric acrylate material, in the subterranean formation.

Also in terms of facilitating the interaction between the microspheres and their functionality in blocking fissures, fractions and porous formations desirably microspheres have a shear storage modulus of at least $1 \times 10^5$ Pascals at 23° C. and 1 Hz, or more desirable a shear storage modulus of at least $1 \times 10^6$ Pascals at 23° C. and 1 Hz.

Microspheres of additives are favorably insoluble in water and/or in organic liquid, in particular in organic liquid used in organic-based drilling fluids, such as oil-based or synthetic-based drilling fluids. Microspheres of additives are also favorably readily dispersible in water and/or in organic liquid. Examples of such organic liquids used in organic-based drilling fluids include petroleum oil, such as crude oil, diesel oil, biodiesel oil, kerosene, mineral oil, gasoline, naptha, toluene; fluids, in particular oleaginous fluids, derived from olefins, linear alpha-olefins, poly alpha-olefins, internal esters and ethers; siloxanes such as polydiorganosiloxanes or organosiloxanes; paraffins such as linear or branched paraffins; polyfunctional alcohols or polyfunctional alcoholic derivatives, such as glycols, polyglycols, polyoxyalkylene, glycol ethers, glycol esters; and mixtures thereof.

For ease in use and addition to a drilling fluid, preferably additives are provided in a dry form (e.g. microspheres provided in the form of a dry powder) or in the form of a suspension (where the microspheres dispersed in a liquid). For additives provided in the form of a suspension, the microspheres are favorably suspended in water, in a solvent, such as a hydrocarbon solvent (e.g. ethyl acetate, tetrahydrofuran, heptane, 2-butanone, benzene, cyclohexane, $C_{12}$-$C_{14}$ hydrocarbon or a mixture thereof), or in an oil, more favorably in a solvent or in an oil, and most favorably in a solvent. Typically such a suspension has a solid content (relative to the microspheres) of at least 10% by weight, more particular at least 40% by weight. Such a suspension may have solid content up to 70% by weight.

Additives can be advantageously designed to include microspheres of a selected mean diameter or even a selected distribution of diameters (e.g. by appropriate mixing) for a particular drilling operation and/or a particular subterranean formation. Additives including microspheres, which have a mean diameter less than 100 microns, are particularly desirably suitable for effective and efficient control of fluid loss. In terms of overall effectiveness and efficiency in control fluid loss, it is desirable that at least 50% by volume of the microspheres have a diameter less than 100 microns, more desirable at least 70% by volume of the microspheres have a diameter less than 100 microns, and most desirable at least 90% by volume of the microspheres have a diameter less than 100 microns. In general for favorable effectiveness in control of fluid loss, it is desirable that additives include microspheres having a mean diameter of at least 0.1 micron, more desirably at least 0.3 micron, even more desirably at least 0.5 micron, most desirably greater than 1 micron. In addition generally it is desirable to use microspheres having a mean diameter equal to or less than 90 microns; more desirably a mean diameter equal to or less than 70 microns; and most desirably a mean diameter equal to or less than 50 microns.

The preservation of the desired properties and/or the desired functionality of the drilling fluid and/or the use of the additive as a "prophylactic" or as a "pill" treatment are favorably further facilitated through the preferred use of microspheres having a density equal to or less than 1.0 g/cm$^3$. This is also facilitated in preferred embodiments in which the microspheres have a density greater than 0.7 g/cm$^3$, more particularly a density of at least 0.8 g/cm$^3$, and most particularly a density of at least 0.9 g/cm$^3$.

Additives can be advantageously designed to include microspheres having selected swelling capabilities (e.g., for a particular type of subterranean formation or porosity). Desirably microspheres are capable of limited or no swelling in naturally occurring hydrocarbons or other organic liquids encountered in a borehole or in an organic liquid used in a drilling fluid (e.g., in an organic-based drilling fluid). Examples of such organic liquids used in organic-based drilling fluids include petroleum-derived oils or petroleum-like oils, such as crude oil, diesel oil, biodiesel oil, kerosene, mineral oil, gasoline, naptha, toluene; fluids, in particular oleaginous fluids, derived from olefins, linear alpha-olefins, poly alpha-olefins, internal esters and ethers; siloxanes such as polydiorganosiloxanes or organosiloxanes; paraffins such as linear and branched paraffins; polyfunctional alcohols or polyfunctional alcoholic derivatives, such as glycols, polyglycols, polyoxyalkylene, glycol ethers, glycol esters; and mixtures thereof. Generally it is desirable that microspheres have a volume swell factor at 50° C. of at most 8, more favorable at most 6, even more favorable at most 4 and most favorable at most 2 in an organic liquid, such as diesel oil, mineral oil, an olefin-derived oil, an ester-derived oil, a (poly) glycol or a (poly)glycol-derivative. Volume swell factor represents the factor increase in volume upon swelling. For example a microsphere which swells to twice in its original diameter would have a volume swell factor of 8, while a microsphere which does not swell would have a volume swell factor of 1. Desirably microspheres show no swelling or only very limited swelling in water. Microspheres may be slightly swellable in water at higher temperatures (e.g. a volume swell factor up to 1.4 (more particularly a volume swell factor up to 1.2) in water at 100° C.). Generally additives wherein the microspheres show very limited or no swelling at 100° C. in water (e.g. volume swell factor equal to or less than 1.4, more particular equal to or less than 1.2) and limited or no swelling at 50° C. in an organic liquid (e.g., an organic liquid contained in a drilling fluid or naturally occurring organic liquid in a borehole) are particularly favorable.

Microspheres may be solid microspheres, hollow microspheres or mixtures thereof. A hollow microsphere may have one or more cavities within the microsphere. In terms of compressibility of microspheres of an additive, the application of hollow microspheres or mixtures of hollow and solid microspheres have been found to be favorable.

Favorable is the use of microspheres comprising a polymerization product comprising: (a) an alkyl acrylate ester or an alkyl methacrylate ester and either (b) a co-monomer or (c) a cross-linking agent or both (b) and (c) (i.e. both a co-monomer and a cross-linking agent). Particularly favorable is the use of microspheres comprising a polymerization product comprising: (a) about 80 to about 99.7 equivalent weight % of at least one alkyl acrylate ester or alkyl methacrylate ester and (b) a polar co-monomer up to about 20 equivalent weight % and/or (c) a multifunctional cross-linking agent up to about 10 equivalent weight %. Moreover microspheres may favorable comprise a polymerization product comprising: about 90 to about 99.7 equivalent weight % of at least one alkyl acrylate ester or alkyl methacrylate ester, and about 0.3 to about 10 equivalent weight % of a multifunctional cross-linking agent. Microspheres may favorable comprise a polymerization product comprising: about 80 to about 99.7 equivalent weight % of at least one alkyl acrylate ester or alkyl methacrylate ester and about 0.3 to about 20 equivalent weight % of a polar co-monomer. Microspheres may favorable comprise a polymerization product comprising: (a) about 80 to about 99.7 equivalent weight % of at least one alkyl acrylate ester or alkyl methacrylate ester, (b) up to about 20 equivalent weight % of a polar co-monomer and (c) up to about 10 equivalent weight % of a multifunctional cross-linking agent. Such polymerization products including a polar co-monomer are more favorable, and such polymerization products including both a polar co-monomer and a multifunctional cross-linking agent are most favorable. The resulting polymeric, acrylate microspheres of such polymerization products are generally, desirably infusible, solvent-dispersible, solvent-insoluble and water-insoluble, while aqueous suspensions of such microspheres resulting from such polymerization products are water-dispersible. The glass transition temperature of the resulting microspheres can be suitably adjusted through appropriate selection of the alkyl (meth)acrylate ester. Also, as applicable, the selection of the appropriate amount of cross-linking agent and/or the appropriate selection of polar co-monomer can allow for adjustment of the glass transition temperature. For example, in general the higher the homopolymer glass transition temperature of an alkyl (meth) acrylate ester the higher the glass transition temperature of the resulting microspheres. Increasing the amount of cross-linking agent will generally increase the glass transition temperature of the resulting microspheres. Also the particular nature of a polar co-monomer can affect the glass transition temperature of the resulting microspheres, for example the use of 2-acrylamido-2-methyl-1-propanesulfonic acid versus acrylic acid as a polar co-monomer generally increases the glass transition temperature of the resulting microspheres.

Alkyl acrylate esters and methacrylate esters particularly useful in preparing the microspheres used in additives described herein are selected from the group consisting of monofunctional unsaturated alkyl acrylate esters and alkyl methacrylate esters of non-tertiary alkyl alcohols and mixtures thereof, the alkyl groups having from about 4 to about 14 carbon atoms. Such monomers are oleophilic, water emulsifiable, have restricted water solubility. Included within this class of monomers are, for example, those monomers selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, isobornyl acrylate and mixtures thereof. Preferred acrylate monomers include those selected from the group consisting of isooctyl acrylate, isononyl acrylate, isoamyl acrylate, isodecyl acrylate, 2-ethylhexyl acrylate, n-butyl acrylate, sec-butyl acrylate, isobornyl acrylate and mixtures thereof. Alkyl acrylate esters, alkyl methacrylate esters, or other free radically polymerizable monofunctional ethylenically unsaturated monomers which, as homopolymers, have glass transition temperatures higher than about −20° C. (e.g., tert-butyl acrylate, isobornyl acrylate, butyl methacrylate, and vinyl acetate) may be utilized in conjunction with one or more of the alkyl acrylate esters or alkyl methacrylate esters described above.

Compositions used to prepare microsphere favorable comprises polar monomer(s) which are copolymerizable with alkyl acrylate ester or alkyl methacrylate ester monomer(s). Examples of suitable polar co-monomers include both strongly polar and moderately polar monomers, and mixtures thereof. Examples of strongly polar monomers include ethylenically unsaturated monocarboxylic and dicarboxylic acids and salts thereof. Examples of such monomers include acrylic acid, beta-carboxy ethyl acrylate and the salts thereof, such as sodium acrylate and ammonium acrylate; methacrylic acid and salts thereof, such as sodium methacrylate and ammonium methacrylate, itaconic acid, fumaric acid, crotonic acid and maleic acid. Further examples of strongly polar monomers include derivatives of ethylenically unsaturated monocarboxylic and dicarboxylic acids and salts thereof as well as derivatives of ethylenically unsaturated monosulfonic acids and salts thereof. Examples include acrylamides and methacrylamides, substituted acrylamides, in particular acid substituted acrylamides and salts thereof (such as 2-acrylamido-2-methyl-1-propanesulfonic acid or its sodium or potassium salt), substituted methacrylamides, in particular acid substituted methacrylamides and salts thereof, dimethyl amino-propyl methacrylate and 2-hydroxyalkyl acrylates, such as 2-hydroxyethyl acrylate. Examples of moderately polar co-monomers include polar vinyl monomers, such as N-vinyl pyrrolidone, N-vinyl caprolactam, acrylonitrile, and mixtures thereof. Other useful polar co-monomers include ionic monomers which are copolymerizable with alkyl acrylate ester or alkyl methacrylate ester monomer(s). Useful ionic monomers include ionic derivatives of ethylenically unsaturated monocarboxylic and dicarboxylic acids (e.g. ionic derivatives of acrylates or methacrylates). Examples include 4,4,9-trimethyl-4-azonia-7-oxo-8-oxa-dec-9-ene-1-sulphonate, N,N-dimethyl-N-(β-methacryloxyethyl) ammonium propionate betaine, trimethylamine methacrylimide and 1,1-dimethyl-1(2,3-dihydroxypropyl) amine methacrylimide. Further useful ionic monomers include ionic vinyl monomers, such as trimethylamine p-vinyl benzimide and sodium styrene sulphonate. Still further useful polar co-monomers include acrylate functional, methacrylate functional, vinyl-functional oligomers and polymers. The term "oligomer" means a polymer molecule comprising a degree of polymerization of from about 2 to about 20 repeating units.

The term "polymer" means a macromolecule with a degree of polymerization of about 21 or more repeating units. Examples of such free radically reactive oligomers and/or polymers include acrylate-, methacrylate-, vinyl-terminated poly(alkylene oxides) (such as acrylate-terminated poly(ethylene oxide); acrylate-, methacrylate-, vinyl-terminated poly (vinyl methyl ethers); acrylate-, methacrylate-, vinyl-terminated poly(acrylamides); acrylate-, methacrylate-, vinyl-terminated poly(n-vinylpyrrolidones); acrylate-, methacrylate-, vinyl-terminated poly(vinyl alcohols); and mixtures thereof. Preferred polar co-monomers include those selected from the group consisting of acrylic acid, beta-carboxy ethyl acrylate, ammonium acrylate, acrylonitrile, N-vinylpyrrolidone, sodium styrene sulphonate, acrylate-terminated poly(ethylene oxide) and mixtures thereof.

Compositions used to prepare the microspheres favorable comprise multifunctional crosslinking agent(s). The term "multifunctional" as used herein refers to crosslinking agents which possess at least two (more particularly at least three) free radically polymerizable ethylenically unsaturated groups. When used, crosslinking agent(s) is (are) favorably used at a level of up to about 10 equivalent weight %, more favorably from about 0.3 to about 7 equivalent weight % of the total polymerizable composition. Useful multifunctional crosslinking agents include those selected from the group consisting of acrylic or methacrylic esters of diols such as butanediol, triols such as glycerol, and tetrafunctional alcohols such as pentaerythritol. Other useful crosslinking agents include those selected from the group consisting of other multifunctional vinyl compounds and multifunctional acrylated oligomers. Preferred crosslinking agents include those selected from the group consisting of multifunctional (meth) acrylates (e.g., 1,4-butanediol diacrylate or 1,6-hexanediol diacrylate); polyvinylic crosslinking agents, such as substituted and unsubstituted divinylbenzene; and difunctional urethane acrylates, such as those available under the trade designation EBECRYL. 270 and EBECRYL. 230 (1500 weight average molecular weight and 5000 weight average molecular weight acrylated polyurethanes, respectively, both available from Cytec Specialty Chemicals, Anderlecht, Belgium).

Microspheres may be prepared by aqueous suspension polymerization technique. In general terms, the polymeric microspheres may be prepared using an emulsification process to form monomer droplets in an aqueous phase, followed by polymerization of the monomer droplets to form microspheres, i.e., microspherical particles of polymer. The emulsion of monomer droplets is typically formed by blending a variety of components in one or more steps. The components typically include monomer(s), initiator, optional cross-linking agents and water. Other components which may be used include stabilizers and thickening agents. The emulsion is preferably formed by agitating the mixture of components using, for example, mechanical or ultrasonic means.

Hollow microspheres useful in the present invention can be made via a "two-step" or "one-step" emulsification process as described, for example, in U.S. Pat. No. 5,053,436 (Delgado).

In the first step of the two-step process, a water-in-oil emulsion is formed by combining an aqueous solution of polar co-monomer(s) with a mixture of at least one alkyl acrylate ester or alkyl methacrylate ester, an initiator and, if applicable, a cross-linking agent in the presence of an emulsifier having a low hydrophilic-lipophilic balance (HLB) value. A thickening agent, (e.g., methyl cellulose) may be included in the aqueous phase prior to formation of the water-in-oil emulsion. Where it is desirable not to include a polar co-monomer, water may be mixed directly with at least one alkyl acrylate ester or alkyl methacrylate ester, initiator and cross-linking agent, and emulsifier to form the water-in-oil emulsion. Suitable emulsifiers are those having an HLB value below about 7, preferably in the range of about 2 to about 7. Emulsifiers having an HLB value of greater than about 7 tend to produce an oil-in-water emulsion as opposed to the desired water-in-oil emulsion. Examples of emulsifiers having HLB values less than 7 include sorbitan monoleate, sorbitan trioleaste, and ethoxylated oleyl alcohol for example available under the trade designation BRIJ 93, available from Sigma-Aldrich, Bornem, Belgium. In the second step, a water-in-oil-in-water emulsion is formed by dispersing the water-in-oil emulsion from the first step into an aqueous phase containing an emulsifier having an HLB value above about 6 and, if applicable, any portion of the polar co-monomers not added in step one. Examples of suitable emulsifiers for the second step include ethoxylated sorbitan monooleate, ethoxylated lauryl alcohol, and alkyl sulfates. In both steps, the concentration of the emulsifier should be greater than its critical micelle concentration.

In a "one step" emulsification process as is described in U.S. Pat. No. 5,053,436 (Delgado), at least one alkyl acrylate or alkyl methacrylate ester and at least one polar co-monomer, initiator and, if applicable, a cross-linking agent are mixed in the presence of at least one emulsifier capable of producing a water-in-oil emulsion inside the droplets which is substantially stable during emulsification and polymerization. As in the two-step emulsification process, the emulsifier is preferably utilized in concentrations greater than its critical micelle concentration. In general, high HLB emulsifiers are required, i.e., emulsifiers having an HLB value of at least about 25, to produce stable cavity-containing droplets during the polymerization. Examples of such emulsifiers include alkylarylether sulfates such as sodium alkylarylether sulfate (e.g., available under the trade designation TRITON W-30 from Dow, Horgen, Switzerland) and alkylarylpolyether sulfates such as alkylarylpoly(ethylene oxide) sulfates. Alkyl sulfates, alkyl ether sulfates, and alkylarylether sulfates are preferred as they provide a maximum void volume per microsphere for a minimum amount of surfactant. Polymeric stabilizers may also be present but are not necessary.

Solid microspheres useful in the present invention, may be prepared via an emulsion process and method described, for example, in U.S. Pat. No. 3,691,140 (Silver). This process comprises aqueous suspension polymerization of at least one alkyl acrylate ester or alkyl methacrylate ester with at least one polar co-monomer in the presence of an initiator and, if applicable, a cross-linking agent and an anionic emulsifier in a concentration greater than its critical micelle concentration. Non-ionic emulsifiers may be included so long as an anionic emulsifier is present and predominates. Examples of emulsifiers include: alkylarylether sulfates; alkylarylpolyether sulfates such as ammonium lauryl sulfate, triethanolamine lauryl sulfate and triethanolamine lauryl sulfate and sodium hexadecyl sulfate; alkyl ether sulfates such as ammonium lauryl ether sulfates; and alkylpolyether sulfates such as alkyl poly (ethylene oxide) sulfates.

The amount of emulsifier used in the aforesaid emulsion processes in suspension polymerization to form the polymeric microspheres is such that it is greater than its critical micelle concentration. The critical micelle concentration is defined as the minimum concentration of emulsifier necessary for the formation of micelles. Critical micelle concentration is typically slightly different for each emulsifier. Useful concentrations typically range from about $1.0 \times 10^{-4}$ to about 3.0 moles/liter.

An initiator is typically used for the polymerization of the monomer droplets. Useful initiators include those which are normally suitable for free radical polymerization of acrylate monomers. Preferred initiators include those which are oil-soluble. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. The initiator is generally present in an amount ranging from about 0.01 to about 10 weight percent of the total weight of the polymerizable composition. Once the appropriate emulsion is prepared in accordance with any of the emulsion processes as described above, polymerization is initiated by application of radiation or heat, for example by heating up to about 60° C.

Following polymerization by any of the useful aqueous suspension polymerization processes described above, an aqueous suspension of microspheres is obtained. The size of the resulting microspheres can generally be tailored through an appropriate selection of the emulsifier, concentration thereof and/or an appropriate selection of agitation during the preparation. The suspension may have non-volatile solid contents of from about 10 to about 50 percent by weight and may be used "as is" as an additive for a drilling fluid to control fluid loss. Alternatively the resulting aqueous suspension may be allowed to stand and separate into two phases, one phase being aqueous and substantially free of polymer, the other phase being an aqueous suspension of microspheres, followed by decantation of the microsphere-rich phase to provide an aqueous suspension having a non-volatile solids content on the order of about 40 to about 70 percent which then may be used as an additive for a drilling fluid to control fluid loss. Alternatively, for example, if desired, the aqueous phase can be removed to provide the microspheres in dried form. For example, the aqueous phase can be precipitated with an alcohol solvent, the precipitate collected and washed to obtain microspheres in dried form. Such obtained microspheres are typically substantially free of surfactant (e.g. at most 1% by weight of surfactant relative to total weight of microspheres). Or alternatively, for example, again as desired, the microspheres can be suspended in a solvent (such as ethylacetate, tetrahydrofuran, heptane, 2-butanone, benzene, cyclohexane, $C_{12}$-$C_{14}$ hydrocarbon, or mixtures thereof) or in an oil (such as diesel oil, biodiesel oil, mineral oil, toluene or mixtures thereof).

For use as a fluid-loss control additive with water-based drilling fluids, to ensure dispersibility of the microspheres in the drilling fluid the microspheres are desirably provided in the form of an aqueous suspension. For use as a fluid-loss control additive with organic-based drilling fluids (e.g., oil-based or synthetic-based), microspheres may be suspended in water, solvent or oil or provided in dried form. For ease in use and rapid dispersion in organic-based drilling fluids, desirably the microspheres are provided in dried form or in the form of a solvent. or oil-based suspension. For use with organic-based drilling fluids, desirably the microspheres are substantially free of surfactant Microspheres of additives described herein are generally, favorably resistance to temperatures up to about 200°. Additives may further comprise an antioxidant to further increase temperature resistance of microspheres. Useful anti-oxidants include anti-oxidants selected from the group consisting of primary anti-oxidants, secondary anti-oxidants, multi-functional anti-oxidants, hydroxylamines, carbon-centered radical scavengers and mixtures thereof. Examples include those available under the trade designations IRGANOX (from Ciba Specialty Chemicals, Brussels, Belgium), SUMILIZER (Sumitomo Chemical, Machelen, Belgium) and mixtures thereof.

As mentioned above, additives described herein are particularly advantageous in that they are favorably suitable for use in various drilling fluids and various types of drilling fluids, such as water-based drilling fluids or organic-based drilling fluids (e.g., oil-based drilling fluids or so-called synthetic-based drilling fluids). Accordingly drilling fluids comprising an additive as described herein may be inter alia water-based drilling fluids or organic-based drilling fluids, such as oil-based drilling fluids, synthetic-based drilling fluids or other organic-based drilling fluids. Additives described herein are particularly favorable for use in controlling fluid loss of organic-based drilling fluids, such as oil-based drilling fluids and synthetic-based drilling fluids as well as other types of organic based drilling fluids). Particularly favorable drilling fluids comprising an additive as described herein include organic-based drilling fluids, such as oil-based drilling fluids, synthetic-based drilling fluids or other organic-based drilling fluids.

A water-based drilling fluid typically includes water/aqueous liquid, forming a continuous phase of the drilling fluid. Water may be for example fresh water, sea water, brine and mixtures thereof. Water-based drilling fluids may also comprise viscosity builders (e.g. clays, such as bentonite, attapulgite and sepiolite, or polymers, such as cellulosics, xanthan gum and polyacrylamides); rheological control agents (e.g. dispersants, such as polyphosphates, tannins, lignites or lignosulfonates, or surfactants); weighting agents (such as barite, hematite, magnetite, siderite, dolomite, calcite or sodium chloride); and/or other additives known in the art, such as hydrate suppressors. Water-based drilling fluids typically comprise aqueous phase, reactive solids and inert solids. Solid weighting agents such as barite or hematite are typically chemically inactive/inert, while reactive solids may include viscosity-builder clays or incorporated hydratable clays and shales from drilled formation. Polymeric viscosity builders and rheological control agents may be suspended or dissolved in the aqueous phase. Water-based drilling fluids may also include other water soluble organic compounds, such as hydrate suppressors (e.g. low molecular weight (2000 g/mol or lower) glycols, polyglycols, polyalkyleneoxides, alkyleneoxide copolymers, alkylene glycol ethers, polyalkyleneoxide glycol ethers, carbohydrates, amino acids, amino sulfonates and alcohols comprising between about 1-3 carbon atoms as well as salts thereof). Water-based drilling fluids may also comprise an oil-in-water emulsion (e.g. up to 25% by weight of an oil in water in the presence of an emulsifier)

Organic-based drilling fluids typically include an organic fluid as a continuous phase. Organic-based drilling fluids include among others oil-based drilling fluid and synthetic-based drilling fluids. Oil-based drilling fluids are typically based on a petroleum oil, e.g. crude oil, diesel oil, biodiesel oil, kerosene, mineral oil, gasoline, naptha, toluene or mixtures thereof. Oil-based drilling fluids most often comprise diesel oil or mineral oil. Oil-based drilling fluids may be "all-oil mud" (i.e. oil-based drilling fluids comprising no or very low amounts of water (less than 10% by volume of an aqueous phase)) or an "invert oil-emulsion mud" (oil-based drilling fluid comprising higher amounts of water (up to 70% by volume of an aqueous phase)). Synthetic-based drilling fluids generally comprise a fluid, in particular oleaginous fluid, derived from olefins, linear alpha-olefins, poly alpha-olefins, internal esters and ethers; siloxanes such as polydiorganosiloxanes or organosiloxanes; paraffins such as linear or branched paraffins; and mixtures thereof. Synthetic-based drilling fluids are similar to oil-based drilling fluids and often referred to "pseudo-oil muds". Similar to the oil-based drilling fluids, synthetic-based drilling fluid may be provided as invert emulsion type mud (e.g. comprising up to 70% by volume of an aqueous phase). Oil-based or synthetic-based drilling fluids, may also comprise viscosity builders (e.g. organophilic clays prepared from bentonite, hectorite or attapulgite and aliphatic amine salts, or colloidal asphalt or polymers, such as cellulosics, xanthan gum and polyacrylamides); rheological control agents (e.g. dispersants, such as polyphosphates, tannins, lignites or lignosulfonates, or surfactants); weighting agents (such as barite, hematite, magnetite, siderite, dolomite, calcite or sodium chloride); and/or other additives known in the art. Other organic-based drilling fluids include drilling fluids in which the base fluid is based on a polyfunctional alcohol or polyfunctional alcoholic derivative, such as glycols, polyglycols, polyoxyalkylene, glycol ethers, glycol esters and mixtures thereof. Such organic-based drilling fluids may also comprise viscosity builders (e.g., polymers, such as cellulosics, xanthan gum, gar gum, polyacrylamides and starchs); rheological control agents (e.g. dispersants); weighting agents; and/or other additives known in the art.

In drilling fluids comprising an additive as described herein suitably the concentration of microspheres is sufficient to reduce fluid loss having regard to the particular drilling operation, subterranean formation and causes for drilling fluid loss. As mentioned above, if desired, the concentration of microspheres in a drilling fluid can be very high. However it has been surprisingly found that for effective control of fluid loss in a drilling fluid, in particular in an organic-based drilling fluid (e.g. an oil-based drilling fluid or a synthetic-based drilling fluid or another type of organic-based drilling fluid) the concentration of microspheres in the drilling fluid need not be high. Favorably the concentration of microspheres in drilling fluid may be 10 w/w % or lower, more favorably 8 w/w % or lower, even more favorably 5 w/w % or lower, and most favorably 3 w/w % or lower. Favorably the concentration of microspheres in drilling fluid is 0.1 w/w % or higher, more favorably 0.3 w/w % or higher, even more favorably 0.8 w/w % or higher, and most favorably 1.5 w/w % or higher. Due to the advantageous effectiveness of additives described herein and/or drilling fluids comprising additives described herein in reducing fluid loss generally the use of other fluid-control loss agents in such drilling fluids is not necessary.

Additives described herein are suitable for "prophylactic" use (e.g., in methods comprising: conducting drilling operations in a subterranean well that penetrates through one or more subterranean formations, wherein the conduct is carried out in the presence of a drilling fluid and an additive as described herein). Additives described herein are also suitable for "pill" type treatment or use (e.g. in methods of reducing fluid loss comprising the step of adding to a drilling fluid an additive as described herein circulating said drilling fluid during the drilling of a well or in methods of reducing fluid loss comprising the step of monitoring drilling fluid losses during the drilling of a well; and if fluid losses exceed an acceptable level injecting an additive as described herein).

EXAMPLE

In a one liter resin reactor equipped with mechanical stirrer, 450 grams of deionized water and 6.0 grams of ammonium lauryl sulfate (obtained from Cognis under the trade designation DISPONIL ALS 33) were charged. The agitation was set to 200 rpm and the reactor heated to 65° C. In a separate container 146.25 grams of 2-ethylhexylacrylate (EHA), 3 grams of acrylic acid, (AA); 0.75 grams of 1,4-butanediol diacrylate (BDDA, obtaining from BASF uder the trade designation LAROMER) and 0.71 gram of benzoyl peroxide (obtained from Atofina under the trade designation LUPEROX A75) were mixed. When the temperature of the reactor reached 65° C. and the initiator had dissolved in the 97.5/2/0.5 weight % ratio of EHA/AA/BDDA monomer mixture, the monomer mixture was added to the reactor while stirring at 400 rpm. The temperature of the reactor dropped to 60° C. and was maintained at 60° C. for 22 hours. After the 22-hour period, the suspension was allowed to cool to room temperature and the suspension filtered, yielding an aqueous dispersion of 60% by weight of microspheres, Hollow microspheres having a mean particle diameter of about 50 microns in diameter were obtained. The majority of microspheres contained a central cavity diameter of about 50% the diameter of the microspheres. The glass transition temperature as determined by DSC was −52° C.

A drilling fluid was obtained from MI Swaco, Stavanger, Norway under trade designation VERSAVERT. The drilling fluid as obtained was free of any fluid loss additive and contained EDC 95/11 as hydrocarbon oil, emulsifers (available under trade designation VERSAVERT SE and PE, MI Swaco), clay (available under trade designation BENTONE 38, MI Swaco), barite, calcium chloride, lime, calcium carbonate, G-seal additive and water.

For rheological and fluid loss testing, drilling fluid as obtained without a fluid loss additive (Comparative) and drilling fluid including microsphere-fluid-loss additive (Example) were used. In regard to the latter, using the aqueous dispersion of microspheres, microspheres were added to the drilling fluid at a concentration of 3 w/w % (weight of microspheres to total weight of drilling fluid). As indicated in Table 1, drilling fluid compositions, with the exception of one set of exemplary compositions, were aged in a roller oven at 120° C. for either 16 hours or 140 hours according to API Recommended Practice 131/25.8 "Procedure for Hot Rolling". Rheology properties were measured at 50° C. using an OFITE model 900 viscometer and API Recommended Practice 131/25.10 "Procedure for Testing After Heat Ageing". Fluid loss was measured at 120° C. and a pressure difference of 500 psi using an OFITE HTHP Filter Press using OFITE 170-19 filter paper (25 micron pores) and API Recommended Practice 131/26.4 "Procedure for High Temperature, High Pressure (HTHP) Filtration". The results are given in Table 1.

TABLE 1

| | Comparative | Example | | |
|---|---|---|---|---|
| | Aged 16 hrs at 120° C. | Not aged | Aged 16 hrs at 120° C. | Aged 140 hrs at 120° C. |
| Rheology | | | | |
| 600 rpm (cP) | 69 | 63 | 63 | 62 |
| 300 rpm (cP) | 40 | 38 | 39 | 37 |
| 200 rpm (cP) | 29 | 29 | 30 | 28 |
| 100 rpm (cP) | 18 | 20 | 21 | 19 |
| Apparent viscosity (cP) | 34.5 | 31.5 | 32 | 31 |
| Plastic viscosity (cP) | 29 | 25 | 25 | 25 |
| Yield Point (cP) | 11 | 13 | 13 | 12 |
| HTHP | | | | |
| Spurt loss (ml/30 min) | 4.8 | n.d. | 0.2 | 0.5 |
| Fluid loss (ml/30 min) | 17.0 | n.d. | 1.8 | 2.0 |

This disclosure presents the invention by way of representation and not limitation. It should be understood that numerous other modifications and embodiments can be devised by those skilled in the art which fall within the scope and spirit of the principles of this invention.

What is claimed is:

1. A fluid loss control additive for a drilling fluid used in a drilling operation to produce a wellbore having a well temperature, said additive comprising polymeric, acrylate, non-agglomerated microspheres, wherein the microspheres have a glass transition temperature, said glass transition temperature being selected so that the microspheres are elastomeric at the well temperature.

2. An additive according to claim 1, wherein the microspheres are insoluble in water.

3. An additive according to claim 1 or claim 2, wherein the microspheres are dispersible in water.

4. An additive according to claim 1, wherein the microspheres have a volume swell factor equal to or less than 1.4 in water at 100° C. or equal to or less than 1.2 in water at 100° C.

5. An additive according to claim 1, wherein the microspheres are insoluble in an organic liquid.

6. An additive according to claim 1, wherein the microspheres are dispersible in an organic liquid.

7. An additive according to claim 1, wherein the microspheres have a volume swell factor equal to or less than 8 in an organic liquid at 50° C., less than 6 in an organic liquid at 50° C., less than 4 in an organic liquid at 50° C., or less than 2 in an organic liquid at 50° C.

8. An additive according to claim 1, wherein the microspheres are infusible.

9. An additive according to claim 1, wherein the microspheres comprise a polymerization product comprising: at least one of an alkyl acrylate ester or an alkyl methacrylate ester and either a co-monomer or a cross-linking agent or both a co-monomer and a cross-linking agent.

10. An additive according to claim 9, wherein the acrylate or methacrylate ester is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, isobornyl acrylate, and mixtures thereof.

11. An additive according to claim 9, wherein the co-monomer is a polar monomer, said polar monomer is selected from the group consisting of ethylenically unsaturated monocarboxylic acids and salts thereof ethylenically unsaturated dicarboxylic acids and salts thereof derivatives of ethylenically unsaturated monocarboxylic acids and salts thereof derivatives of ethylenically unsaturated dicarboxylic acids and salts thereof derivatives of ethylenically unsaturated monosulfonic acids and salts thereof, vinyl monomers; ionic monomers derived from ethylenically unsaturated monocarboxylic acids; ionic monomers derived from ethylenically unsaturated dicarboxylic acids; ionic vinyl monomers; acrylate functional oligomers and polymers; methacrylate functional oligomers and polymers; vinyl-functional oligomers and polymers; and mixtures thereof.

12. An additive according to claim 9, wherein the cross-linking agent is a multifunctional cross-linking agent selected from the group consisting of multifunctional acrylates, methacrylates, polyvinylic agents and mixtures thereof.

13. A drilling fluid comprising an additive according to claim 1.

14. A drilling fluid according to claim 13 wherein the drilling fluid is a water-based drilling fluid.

15. A drilling fluid according to claim 13, wherein the drilling fluid is an organic-based drilling fluid.

16. A drilling fluid according to claim 13, wherein the concentration of microspheres in drilling fluid is equal to or less than 10 w/w %.

17. A drilling fluid according to claim 13, wherein the concentration of microspheres in drilling fluid is equal to or greater than 0.1 w/w %.

18. A method of reducing fluid loss comprising the step of adding to a drilling fluid an additive in accordance with claim 1; and circulating said drilling fluid during the drilling of a well.

19. A method of reducing fluid loss comprising the step of monitoring drilling fluid losses during the drilling of a well; and if fluid losses exceed an acceptable level injecting an additive in accordance with claim 1 into the well.

20. A method comprising: conducting drilling operations in a subterranean well that penetrates through at least one subterranean formation, wherein the conduct is carried out in the presence of a drilling fluid and an additive in accordance with claim 1.

* * * * *